United States Patent
Collin et al.

(10) Patent No.: US 8,007,834 B2
(45) Date of Patent: Aug. 30, 2011

(54) MICROBIOCIDAL COATINGS

(75) Inventors: Jennifer Reichl Collin, Devon, PA (US); Tirthankar Ghosh, Oreland, PA (US); Fanwen Zeng, Belle Mead, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 91 days.

(21) Appl. No.: 12/584,324

(22) Filed: Sep. 3, 2009

(65) Prior Publication Data
US 2010/0081729 A1    Apr. 1, 2010

Related U.S. Application Data

(60) Provisional application No. 61/190,954, filed on Sep. 4, 2008.

(51) Int. Cl.
*A61K 33/36* (2006.01)
*A61K 31/4146* (2006.01)

(52) U.S. Cl. ......................... 424/672; 424/445

(58) Field of Classification Search .................. 424/672; 514/396
See application file for complete search history.

(56) References Cited

U.S. PATENT DOCUMENTS

| | | | | |
|---|---|---|---|---|
| 3,576,760 A | * | 4/1971 | Gould et al. | 424/497 |
| 3,966,902 A | * | 6/1976 | Chromecek | 424/59 |
| 4,515,593 A | * | 5/1985 | Norton | 604/265 |
| 4,582,052 A | * | 4/1986 | Dunn et al. | 128/839 |
| 4,810,489 A | * | 3/1989 | Murray et al. | 424/59 |
| 5,154,920 A | * | 10/1992 | Flesher et al. | 514/643 |
| 7,226,968 B2 | * | 6/2007 | Hodge et al. | 524/514 |
| 2003/0224030 A1 | * | 12/2003 | Uchiyama et al. | 424/405 |
| 2004/0236048 A1 | * | 11/2004 | Michel et al. | 526/264 |
| 2007/0004596 A1 | * | 1/2007 | Kritzler | 504/354 |
| 2008/0293848 A1 | * | 11/2008 | Tomko et al. | 523/122 |

FOREIGN PATENT DOCUMENTS

| | | |
|---|---|---|
| EP | 0194770 | 9/1986 |
| EP | 194770 A2 * | 9/1986 |
| WO | WO9604899 | 2/1996 |

* cited by examiner

*Primary Examiner* — James J Seidleck
*Assistant Examiner* — Peter A Salamon
(74) *Attorney, Agent, or Firm* — Carl P. Hemenway

(57) ABSTRACT

There is provided a coating composition comprising
(a) one or more microbicide,
(b) one or more soluble polymer comprising, as polymerized units, one or more monomer with one or more pendant heterocycle, wherein said heterocycle has one or more hetero atom selected from the group consisting of N, O, S, and combinations thereof, and wherein said polymer has no anionic groups, and
(c) solvent,
wherein said polymer is dissolved in said solvent; wherein said composition contains no polymeric biguanide; and wherein 50% or more of said microbicide, by weight based on the total weight of microbicide, is not covalently bonded to any polymer.

14 Claims, No Drawings

MICROBIOCIDAL COATINGS

This application claims the benefit of priority under 35 U.S.C. §119(e) of U.S. Provisional Patent Application No. 61/190,954 filed on Sep. 4, 2008.

BACKGROUND

It is often desirable to provide a surface on which microorganisms, many of which are potentially harmful, are inhibited from growing. Many useful materials have surfaces that do not normally inhibit the growth of microorganisms. One useful way to improve the microorganism inhibition of a surface is to coat that surface with a coating that provides a microorganism-inhibiting effect. It is desirable that such coatings, when dry, have one or more of the following desirable properties: clarity, non-tackiness; durability; removability; and ability to maintain microorganism-inhibition after being cleaned aggressively.

One approach to providing a microorganism-inhibiting coating is disclosed by U.S. Pat. No. 7,226,968, which involves a combination of a basic vinyl comb type copolymer with an antimicrobial agent that contains a polymeric biguanide, alone or in combination with another micobiologically active component. It is desired to provide a microorganism-inhibiting coating that has one or more of the above-mentioned desirable properties and that does not require the use of a polymeric biguanide.

STATEMENT OF THE INVENTION

In one aspect of the present invention, there is provided a coating composition comprising
 (a) one or more microbicide,
 (b) one or more soluble polymer comprising, as polymerized units, one or more monomer with one or more pendant heterocycle, wherein said heterocycle has one or more hetero atom selected from the group consisting of N, O, S, and combinations thereof, wherein said soluble polymer has no anionic groups, with the proviso that, if every one of said pendant heterocycles is saturated, then said soluble polymer additionally comprises one or more polymerized units of one or more heterocycle-free vinyl monomer, and
 (c) solvent,
wherein said polymer is dissolved in said solvent; wherein said composition contains no polymeric biguanide; and wherein 50% or more of said microbicide, by weight based on the total weight of microbicide, is not covalently bonded to any polymer.

DETAILED DESCRIPTION

As used herein, the following terms have the designated definitions, unless the context clearly indicates otherwise. The term "microbicide", "biocide", "preservative" or "antimicrobial compound" refers to a compound capable of killing, inhibiting the growth of, or controlling the growth of microorganisms at a locus; microbicides include bactericides, fungicides and algicides. The term "microorganism" includes, for example, fungi (such as yeast and mold), bacteria, and algae. The term "locus" refers to a system or product, or surface thereof, that is subject to contamination by microorganisms. Some suitable loci include, for example, industrial loci, personal care loci, and home care loci.

Microorganisms that are affected by microbicide include, but are not limited to, *Aureobasidium pullulans*, *Bacillus cereus*, *Bacillus thuringiensis*, *Chaetomium globosum*, *Enterobacter aerogines*, *Escherichia coli*, *Gliocladtum virens*, *Klebsiella Pheumoniae*, *Legionella pneumpophila*, *Listeria Monocytogenes*, *Mycobacterium tuberculosis*, *Porphyromonas gingivalis*, *Proteus mirabilis*, *Proteus vulgaris*, *Pseudomonas aeruginosa*, *Saccharomyces cerevisiae*, *Salmonella gallinarum*, *Salmonella typhimurium*, *Staphylococcus aureus*, *Staphylococcus epidermidis*, *Streptococcus agalactiae*, *Streptococcus faecalis*, *Streptococcus mutans*, *Trycophyton malmsten*, *Vibrio parahaemolyticus*, *Stachybotrys*, *Aspergillus niger*, *Candida albicans* and *Penicillium funiculosum*.

Unless otherwise specified, temperatures discussed herein are in degrees centigrade (° C.), and references to percentages (%) are by weight.

A "polymer," as used herein and as defined by F W Billmeyer, JR. in Textbook of Polymer Science, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography (SEC, also called gel permeation chromatography or GPC). Generally, polymers have weight-average molecular weight (Mw) of 1,000 or more. Polymers may have extremely high Mw; some polymers have Mw above 1,000,000; typical polymers have Mw of 1,000,000 or less. Some polymers are crosslinked, and crosslinked polymers are considered to have infinite Mw. Some polymers are characterized by Mn, the number-average molecular weight.

As used herein "weight of polymer" means the dry weight of polymer.

A polymer is usefully characterized by its glass transition temperature (Tg). The glass transition temperature (Tg) of a polymer is measured by differential scanning calorimetry (DSC). A polymer may, in some cases, have more than one Tg. As used herein, when a polymer is said to have Tg of a certain value or higher, if the polymer has more than one Tg, it is meant that, the value of the lowest Tg is that certain value or higher. Similarly, as used herein, when a polymer is said to have Tg of a certain value or lower, if the polymer has more than one Tg, it is meant that the value of the highest Tg is that certain value or lower.

Molecules that can react with each other to form the repeat units of a polymer are known herein as "monomers."

One example of a class of monomers that are useful in the present invention are, for example, ethylenically unsaturated monomers (i.e., monomers that have at least one carbon-carbon double bond). Among such monomers are, for example, vinyl monomers, which are molecules that have at least one vinyl group (i.e.,

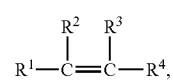

where each of R1, R2, R3, and R4 is, independently, a hydrogen, a halogen, an aliphatic group (such as, for example, an alkyl group), a substituted aliphatic group, an aryl group, a substituted aryl group, another substituted or unsubstituted organic group, or any combination thereof. Some suitable vinyl monomers include, for example, styrene, substituted styrenes, dienes, ethylene, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. In some embodiments, substituted monomers include, for example, monomers with more than one carbon-carbon double bond, monomers with hydroxyl groups, monomers with other functional groups, and monomers with combinations of functional groups.

A polymer that is made by polymerizing a certain monomer, either alone or with other monomers, is said herein to include that monomer as a polymerized unit.

A chemical group that is part of a polymer is said herein to be "pendant" if it is covalently attached to the polymer but is not part of the backbone of the polymer chain.

As used herein, a "solvent" is a material that is liquid at 25° C.; that has boiling point, at 1 atmosphere pressure, of greater than 25° C.; and that is capable of dissolving a polymer of the present invention. A polymer is herein considered dissolved in a solvent if individual polymer chains are in intimate contact with the solvent. Individual dissolved polymer chains may be linear or branched. In typical solutions, each polymer chain is in a random coil configuration or a close approximation thereof. A polymer solution will not settle or form a separate phase upon standing for at least 5 days at 23° C. Some polymer solutions are clear to the naked eye, and some polymer solutions appear hazy.

A solvent may be a pure substance or it may contain plural substances dissolved in each other. For example, a solvent may contain two or more miscible liquids. Material that is solid at 25° C. is not considered to be part of the solvent, whether or not it is dissolved in liquid. As used herein, a solvent is "aqueous" if the solvent contains 50% or more water by weight based on the weight of the solvent. All other solvents are considered herein to be non-aqueous.

As used herein, when a ratio is said to be "X:1 or higher (or lower)" it is meant that the ratio has value of Y:1, where Y is equal to X or is higher (or lower).

As used herein, a heterocycle is a cyclic organic radical in which at least one member of the ring is a nitrogen atom, an oxygen atom, or a sulfur atom. A heterocycle is considered herein to be "unsaturated or aromatic" if there is at least one pair of members of the ring in which the two members of that pair are connected to each other by a double bond. A heterocycle is not considered herein to be "unsaturated or aromatic" if all of the members of the ring are connected to each other by single bonds, even if one or more member of the ring is connected by a double bond to an atom that is not a member of the ring.

Biguanide radical is the radical with the structure

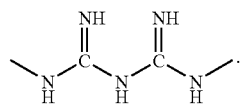

As used herein, a polymeric biguanide is a compound that contains two or more biguanide radicals. In a polymeric biguanide, the biguanide radicals may, for example, be connected to each other via a linking group. The compound "biguanide" is the biguanide radical, capped with two hydrogens.

The microbicide of the present invention is not a polymeric biguanide. The microbicide of the present invention does not include a polymeric biguanide. In some embodiments, the composition of the present invention does not contain any polymeric biguanide. In some embodiments, the composition of the present invention does not contain any biguanide. In some embodiments, the composition of the present invention does not contain any compound the structure of which contains a biguanide radical.

Most of the microbicide of the present invention is not covalently bound to any polymer. That is, 50% or more by weight of the microbicide, based on the total weight of microbicide, is not covalently bound to any polymer. In some embodiments, the amount of microbicide that is not covalently bound to any polymer is, by weight based on the total weight of microbicide, 75% or more; or 90% or more; or 99% or more; or 100%.

In some embodiments, the molecular weight of the microbicide of the present invention is 5,000 or less; or 2,000 or less; or 1,000 or less; or 500 or less.

Any microbicide that meets the above criteria is suitable for use in the present invention. Suitable microbicides include, for example, quaternary ammonium microbicides, phenolic microbicides, chlorine and bromine oxidizing microbicides, organosulfur microbicides, heterocyclic microbicides, non-quaternary nitrogen-containing microbicides, other microbicides, and combinations thereof.

Suitable quaternary ammonium microbicides include, for example, those in which one or more of the groups attached to the quaternary nitrogen atom is an alkyl group with 8 or more carbon atoms. Suitable quaternary ammonium microbicides may have any counter ion, including, for example, halide ion, such as, for example, bromide or chloride ion. Some suitable quaternary ammonium microbicides have chloride counter ion. Among the suitable quaternary ammonium microbicides are, for example, alkyl pyridinium compounds. Among the suitable quaternary ammonium microbicides are, for example, compounds in which one or more trialkoxysilane-substituted alkyl group is attached to the quaternary nitrogen.

Also among the suitable quaternary ammonium microbicides are, for example, compounds in which a quaternary nitrogen atom is attached to two or more short alkyl groups, one or more long alkyl group, and, optionally, one benzyl group. The benzyl group, if present, may be unsubstituted or substituted. Suitable substituted benzyl groups include, for example, benzyl groups with one, two, or three halogen atoms attached to the benzene ring; and benzyl groups with one or more alkyl groups (such as, for example, an ethyl group) attached to the benzene ring. Suitable short alkyl groups have three or fewer carbon atoms; or two or fewer carbon atoms; or one carbon atom. Suitable long alkyl groups have 8 or more carbon atoms, or 12 or more carbon atoms, or 16 or more carbon atoms. Some suitable quaternary ammonium microbicides are, for example, the benzalkonium chloride compounds, also called alkyl dimethylbenzyl ammonium chloride, which are compounds in which the counter ion is chloride and in which the quaternary nitrogen is attached to one benzyl group, two methyl groups, and one long alkyl group. Some suitable quaternary ammonium microbicides are, for example, dialkyl dimethyl ammonium compounds, in which the quaternary nitrogen is attached to two long alkyl groups and two short alkyl groups. Some suitable quaternary ammonium microbicides are, for example, alkyl trimethyl ammonium compounds, in which the quaternary nitrogen is attached to one long alkyl group and three short alkyl groups.

Among the suitable phenolic microbicides are those, for example, in which a ring hydrogen on a phenol molecule is substituted with one or more halogen atom, one or more phenyl group, one or more benzyl group, one or more phenoxy group, one or more chlorophenoxy group, one or more dichlorophenoxy group, one or more alkyl group, or a combination thereof. Some suitable phenolic microbicides include, for example, 2-phenyl-4-chlorophenol, o-phenylphenol, pentachlorophenol, 2(2',4'-dichlorophenoxy)-5-chlorophenol, 4-chloro-3-methylphenol, and mixtures thereof. In some embodiments, o-phenyl phenol is used.

Another suitable microbicide is biguanide that is not polymeric biguanide.

Mixtures of suitable microbicides are also suitable.

In some embodiments, not only is the composition free of polymeric biguanide, the composition of the present invention is also free of biguanide (i.e., non-polymeric biguanide). Independently, in some embodiments, the composition of the present invention contains one or more quaternary ammonium microbicides, one or more phenolic microbicides, or a combination thereof. In some embodiments, every microbicide present in the composition of the present invention is either a phenolic microbicide or quaternary ammonium microbicide. Independently, in some embodiments, the composition of the present invention contains one or more quaternary ammonium microbicide. In some embodiments, every microbicide present in the composition of the present invention is a quaternary ammonium microbicide.

In some embodiments, the amount of microbicide in the composition of the present invention is, by weight based on the total weight of the composition, 0.01% or more; or 0.02% or more; or 0.05% or more; or 0.1% or more; or 0.2% or more. Independently, in some embodiments, the amount of microbicide in the composition of the present invention is, by weight based on the total weight of the composition, 15% or less; or 10% or less; or 8% or less.

The present invention involves the use of one or more soluble polymer that has no anionic groups. The statement that the polymer has no anionic groups means herein that, in the composition of the present invention, the polymer has no groups that are in an anionic state when the composition of the present invention has pH of 2 or higher. In some embodiments, the polymer has no groups that are in an anionic state when the composition of the present invention has pH of 3 or higher; or 5 or higher; or 6 or higher; or 7 or higher. Independently, in some embodiments, the polymer of the present invention has no pendant carboxylic acid groups. In some embodiments, the polymer of the present invention has no pendant carboxylic acid groups and no pendant sulfonic acid groups. In some embodiments, the polymer of the present invention has no pendant acid groups of any kind.

In some embodiments, the present invention involves the use of one or more nonionic soluble polymer. The statement that the polymer is nonionic means herein that, in the composition of the present invention, the polymer does not have functional groups that are ionic. In some embodiments, the polymer has no groups that are in an ionic state when the composition of the present invention has pH of 3 or higher; or 5 or higher; or 6 or higher; or 7 or higher. In some embodiments, the polymer has no groups that are in an ionic state when the composition of the present invention has pH of 12 or lower; or 10 or lower; or 8 or lower.

In some embodiments, a polymer of the present invention is a vinyl polymer. As used herein, a vinyl polymer is a polymer formed from vinyl monomers by polymerization reaction among carbon-carbon double bonds to form the polymer backbone. In some embodiments, vinyl polymers are made by free-radical polymerization.

A polymer of the present invention has polymerized units of one or more monomer (herein called a "first monomer") with one or more pendant heterocycle. As used herein, a heterocycle is pendant when it is covalently attached to the monomer in such a way that the heterocycle will not participate in the polymerization reaction. That is, the heterocycle will be pendant on the polymer chain after the monomer participates in a polymerization reaction. For example, a vinyl group may be attached to a heterocycle, either directly or through a linking group; the vinyl group is then capable of participating in a polymerization reaction with other vinyl groups without any participation by the heterocycle.

Suitable heterocycles include those, for example, with 5 or more members of the heterocycle ring. Independently, suitable heterocycles include those, for example, with 9 or fewer members of the heterocycle ring; or 7 or fewer members. Each suitable heterocycle has one or more member of the heterocycle ring that is one or more nitrogen, or one or more oxygen, or one or more sulfur, or a combination thereof.

Suitable heterocycles may be saturated, unsaturated, or aromatic. Suitable unsaturated heterocycles are, for example, pyrrole and pyrrolidone. One suitable first monomer is n-vinyl pyrrolidone.

Polymers in which every polymerized unit is a monomer with a pendant saturated heterocycle are not considered to be polymers of the present invention. For example, homopolymer of n-vinyl pyrrolidone is not considered to be a polymer of the present invention.

In some embodiments, the first monomer includes one or more monomer with unsaturated or aromatic heterocycle.

Suitable heterocycles include, for example, 5-membered rings with two double bonds. Some of such heterocycles include, for example, those in which the members of the ring include one sulfur atom, one nitrogen atom and one oxygen atom, one nitrogen atom, two nitrogen atoms, three nitrogen atoms, or 4 nitrogen atoms. Some suitable 5-membered heterocycles include, for example, imidazole, thiophene, pyrrole, oxazole, thiazole, triazole, tetrazole, isomers thereof, and combinations thereof.

Independently, suitable heterocycles include, for example, 6 membered rings with three double bonds. Among such heterocycles are those, for example, in which the members of the ring include one, two, or three nitrogen atoms. Some suitable 6-membered heterocycles include, for example, pyridine, pyridazine, pyrimidine, pyrazine, isomers thereof, and combinations thereof.

Independently, suitable heterocycles include, for example, groups in which a heterocycle is fused with another heterocycle or with a carbocycle to form a 9 to 14 membered structure. "Fused" means that two cycles share two or more adjacent atoms that are members of both rings. Some examples of such fused structures include, for example, indazole, benzotriazole, benzimidazole, and combinations thereof.

One suitable first monomer is vinylimidazole. In some embodiments, every first monomer is a monomer with a pendant unsaturated or aromatic heterocycle. In some embodiments, every first monomer is vinylimidazole.

One suitable polymer of the present invention is homopolymer of vinylimidazole.

In some embodiments, the amount of polymerized units of first monomer, by weight based on the weight of polymer, is 5% or more; or 10% or more; or 25% or more; or 30% or more; or 40% or more. Independently, in some embodiments, the amount of polymerized units of first monomer, by weight based on the weight of polymer, is 100% or less; or 80% or less; or 60% or less.

In embodiments in which every pendant heterocycle of every first monomer is saturated, the polymer of the present invention contains at least one polymerized unit of a heterocycle-free vinyl monomer. As used herein, any vinyl monomer that does not contain a pendant heterocycle is a heterocycle-free vinyl monomer. Suitable heterocycle-free vinyl monomers include, for example, ethenyl esters of substituted and unsubstituted alkanoic acids, substituted and unsubstituted alkyl esters of (meth)acrylic acid, and mixtures thereof.

For example, some suitable polymers of the present invention are copolymers of n-vinyl pyrrolidone with one or more heterocycle-free vinyl monomers selected from unsubstituted alkyl ester of (meth)acrylic acid, ethenyl esters of unsubstituted alkanoic acid, and mixtures thereof. Such copolymers may optionally contain polymerized units of one or more additional monomers. For another example, some suitable polymers of the present invention are copolymers of n-vinyl pyrrolidone with one or more monomer having a pendant unsaturated or aromatic heterocycle, with or without one or more additional monomers.

In some embodiments, a polymer of the present invention also includes polymerized units of one or more monomer other than the above-described first monomer. Some suitable monomers that are not first monomers include, for example, water-soluble monomers. A water-soluble monomer that is not a first monomer is herein called a second monomer. A monomer is considered water soluble herein if is soluble in water in an amount, by weight of monomer based on the weight of water, of 0.1% or more. In some embodiments, a water soluble monomer is used that is soluble in water in an amount, by weight of monomer based on the weight of water, or 0.3% or more; or 1% or more; or 3% or more.

Some suitable second monomers include, for example, water-soluble vinyl monomers. Some suitable water-soluble vinyl second monomers include, for example, water soluble (meth)acrylates, water-soluble (meth)acrylamides, and other water-soluble amine monomers (i.e., water-soluble amine monomers that are not first monomers as defined herein above). Water soluble (meth)acrylates include, for example, polyethylene glycol methacrylate. In some embodiments in which polyethylene glycol methacrylate is used, the polyethylene chain is 10 units or longer; or 30 units or longer; or 100 units or longer. Independently, in some embodiments in which polyethylene glycol methacrylate is used, the polyethylene chain is 1,000 units or shorter; or 500 units or shorter. Water-soluble (meth)acrylamides include, for example, acrylamide, methacrylamide, and water-soluble substituted versions thereof. Other water-soluble amine monomers include, for example, n-vinyl pyrrolidone. In some embodiments, one or more polyethylene glycol methacrylate is used. In some embodiments, n-vinyl pyrrolidone is used. In some embodiments, every water-soluble monomer that is not a first monomer is a polyethylene glycol methacrylate or is n-vinyl pyrrolidone. In some embodiments, every water-soluble monomer that is not a first monomer is a polyethylene glycol methacrylate.

In some embodiments, the amount of polymerized units of second monomer that is present in a polymer of the present invention is, by weight based on the weight of the polymer, 95% or less, or 90% or less; or 75% or less; or 60% or less. Independently, in some embodiments, the amount of polymerized units of second monomer that is present in a polymer of the present invention is, by weight based on the weight of the polymer, 5% or more; or 10% or more; or 20% or more; or 40% or more. In some embodiments, no polymerized units of second monomer are present in a polymer of the present invention.

In some embodiments, every polymerized unit in the polymer of the present invention is either a first monomer or a second monomer.

In some embodiments, a polymer of the present invention contains polymerized units of one or more third monomer. As used herein, a third monomer is a monomer that is neither a first monomer nor a second monomer. If a third monomer is present, the third monomer may be any monomer that is capable of copolymerizing with the first monomer(s) and (if one or more is present) the second monomer(s). It is contemplated that any third monomer that is used will be chosen so that the polymer of the present invention will be soluble and will not have anionic groups. In some embodiments, one or more third monomer is used that is a vinyl monomer. Some suitable third monomers include, for example, substituted or unsubstituted alkyl esters of (meth)acrylic acid, ethenyl esters of substituted or unsubstituted alkanoic acids, and mixtures thereof.

In some embodiments, one or more third monomer is used that is a hydrophobic monomer. Hydrophobic monomers include, for example, monomers that contain a fatty hydrocarbon chain. A fatty hydrocarbon chain is an unsubstituted hydrocarbon chain, linear or branched, with 6 or more carbon atoms. In some embodiments, a third monomer is used that contains a hydrocarbon chain, and the number of carbon atoms in the hydrocarbon chain is 6 or more, or 8 or more, or 10 or more. In some embodiments, one or more hydrophobic monomer is used that is an alkyl ester of (meth)acrylic acid, in which the alkyl group is a fatty hydrocarbon chain. In some embodiments, one or more hydrophobic monomer is used that is an alkyl-substituted vinyl aromatic monomer, in which the alkyl group is a fatty hydrocarbon chain. In some embodiments, one or more hydrophobic monomer is used that is an ethenyl ester of an alkanoic acid, in which the alkyl group of the alkanoic acid is a fatty hydrocarbon chain.

In some of the embodiments in which a hydrophobic monomer is used, the amount of polymerized units of hydrophobic monomer, by weight based on the weight of the polymer, is 1% or more; or 2% or more; or 5% or more. Independently, in some of the embodiments in which a hydrophobic monomer is used, the amount of polymerized units of hydrophobic monomer, by weight based on the weight of the polymer, is 30% or less; or 20% or less; or 15% or less.

A polymer of the present invention can usefully be characterized by its Tg. The Tg is considered an intrinsic property of the polymer and is therefore measured on a sample of the polymer with impurities, including water, microbicide, and other impurities, removed. In some embodiments, a polymer of the present invention has Tg of 40° C. or higher; or 60° C. or higher; or 75° C. or higher. Independently, in some embodiments, a polymer of the present invention has Tg of 150° C. or lower; or 130° C. or lower; or 115° C. or lower; or 100° C. or lower.

It is also useful to characterize the Tg of the dried coating composition of the present invention. The dried coating composition contains polymer, microbicide, and possibly other nonvolatile ingredients. In some embodiments, the Tg of the dried coating composition will be 20° C. or higher; or 25° C. or higher; or 30° C. or higher. Independently, in some embodiments, the Tg of the dried coating composition will be 150° C. or lower. In some embodiments, the Tg of the dried coating composition will be lower than the intrinsic Tg of the soluble polymer.

In some embodiments, the amount of polymer, by weight based on the total weight of the composition, is 0.01% or more; or 0.02% or more; or 0.05% or more; or 0.2% or more; or 0.5% or more. Independently, in some embodiments, the amount of polymer, by weight based on the total weight of the composition, is 10% or less; or 5% or less; or 2% or less.

Independent of the amount of polymer used, in some embodiments, the weight ratio of microbicide to polymer is 0.01:1 or higher; or 0.02:1 or higher; or 0.05:1 or higher; or 0.1:1 or higher. Independently, in some embodiments, the weight ratio of microbicide to polymer is 8:1 or lower; or 5:1 or lower; or 2:1 or lower; or 1:1 or lower; or 0.5:1 or lower.

The practice of the present invention involves the use of solvent. Any solvent is suitable. In some embodiments, the solvent is aqueous. In some embodiments, the amount of water in the solvent, by weight based on the weight of solvent is 75% or more, or 85% or more; or 95% or more; or 99% or more. In some embodiments, the solvent contains one or more alkyl alcohol. Among the suitable alkyl alcohols are, for example, those with 10 or fewer carbon atoms; or 6 or fewer carbon atoms; or 4 or fewer carbon atoms; or 3 or fewer carbon atoms. Independently, among the suitable alkyl alcohols are, for example, those with 2 or more carbon atoms. In some embodiments, ethanol is used, either alone or mixed with water.

In some embodiments, the composition of the present invention contains one or more epoxide compound. An epoxide compound is any compound that has one or more epoxide group. In some embodiments in which an epoxide compound is present, one or more epoxide compound is used that has two or more epoxide groups.

In some embodiments in which an epoxide compound is present, a polymer of the present invention contains polymerized units of one or more monomer having pendant heterocycle, in which that heterocycle is capable of reacting with an epoxide group. For example, in some embodiments in which an epoxide compound is used, the polymer of the present invention contains polymerized units of vinyl imidazole.

In some of the embodiments in which an epoxide compound is present and in which the polymer of the present invention has pendant heterocycles that are capable of reacting with epoxide, the molar ratio of epoxide groups to such heterocycles is 0.1:1 or higher; or 0.2:1 or higher; or 0.5:1 or higher. Independently, in some of the embodiments in which an epoxide compound is present and in which the polymer of the present invention has pendant heterocycles that are capable of reacting with epoxide, the molar ratio of epoxide groups to such heterocycles is 10:1 or lower; or 5:1 or lower; or 2:1 or lower.

It is contemplated that one method of making use of the composition of the present invention is to apply a layer of the composition to a substrate and dry the composition or allow it to dry. The act of applying a layer of the composition to a substrate is known herein as "coating" the substrate. It is contemplated that, as the solvent evaporates, polymer in the composition will form a film on the substrate. The dried layer of the composition is known herein as "a coating." Drying may, for example, be suitably done at 20° C. or higher. In some embodiments, drying may suitably be done at 50° C. or higher; or 100° C. or higher. Drying, at any temperature, may, for example, be conducted by exposing the composition to atmosphere that is mechanically forced to move or by exposing the composition atmosphere that is not mechanically forced.

Composition may be applied to a substrate by any method, including methods conducted by hand and methods conducted by machine and combinations thereof. For example, composition may be applied by spraying (pump, aerosol, pressure, etc.), pouring, spreading, metering (for example, with a rod or bar), mopping, wiping, brushing, dipping, mechanical application, other application methods, or combination thereof. It is contemplated that the composition could be altered (for example, by adjusting solids level, adding one or more adjuvants, etc.) so that the coating composition would have the proper properties for the chosen method of applying to substrate.

Suitable adjuvants include, for example, rheology modifiers, such as, for example, structurants, thickeners, and mixtures thereof.

In some embodiments, after a layer of composition of the present invention is applied to a substrate and dried, the resulting coating is not tacky. One method of assessing tack is to measure the Tg of the dried layer of the composition of the present invention. The Tg of the dried composition of the present invention may possibly be different from the Tg of the polymer because other ingredients in the composition may possibly alter the Tg, by acting as, for example, as one or more of plasticizer, tackifier, hardener, crosslinker, etc. A dry coating is considered herein to be not tacky if the Tg of the dry coating is 25° C. or higher.

An alternative method of measuring tack is the Probe Tack Test, ASTM D 2979-01 (published by the American Society of Testing and Materials, West Conshohocken, Pa., USA). A dry coating that requires 1 N or less force to remove the probe is considered herein to be not tacky.

A dry layer of a coating that is not tacky by either or both of the above criteria is considered herein to be not tacky.

Among some embodiments of the composition of the present invention in which the composition of the present invention contains one or more epoxide compound, included are embodiments, for example, in which the amount of polymer, by weight based on the total weight of the composition, is 1% or less; or 0.5% or less; or 0.2% or less.

Independently, among some embodiments of the composition of the present invention in which the composition of the present invention contains one or more epoxide compound, included are embodiments, for example, in which the coating is dried at temperature of 40° C. or higher; or 50° C. or higher; or 60° C. or higher. In such embodiments, it is contemplated that the epoxide groups do not react during storage or during the act of coating and that the epoxide groups react with the polymer in the composition during the drying process. In some of such embodiments, each epoxide compound has two or more epoxide groups, and the result of the reaction between polymer and epoxide is that the dried coating will contain crosslinked polymer. In some of such embodiments, the composition will not be soluble after the crosslinking has taken place.

It is expected that coatings of the present invention have microbicidal activity. It is further expected that coatings of the present invention will maintain that microbicidal activity after being subjected to cleaning operations, even comparatively aggressive cleaning operations such as, for example, scrubbing.

In some embodiments, the coating composition of the present invention contains little or no polyurethane. That is, in such embodiments, the amount of polyurethane in the coating composition of the present invention is either zero or, if not zero, is, by weight of dry polyurethane based on the weight of the coating composition, 0.01% or less; or 0.001% or less.

The coating composition of the present invention may be packaged in any form. For example, the coating composition of the present invention may be an aerosol spray; or a pump spray; or a liquid suitable for applying to a substrate with an applicator such as, for example, a brush, roller, or mop; or a concentrated liquid that, when diluted, will be suitable for applying to a substrate with an applicator such as, for example, a brush, roller, or mop.

The coating composition of the present invention may be put to use by coating any substrate. Some suitable substrates include, for example, walls, floors, ceilings, partitions, instruments, etc. Suitable substrates may be found in various settings including, for example, food preparation areas, households, industrial settings, architectural settings, medical settings, sinks, toilets, etc. Substrates may be made of any material; some suitable substrate compositions include, for example, plastic (including, for example, laminates and wall coverings), formica, metal, glass, paper (such as, for example, wallpaper), fabric, finished or unfinished wood, etc.

It is to be understood that for purposes of the present specification and claims that the range and ratio limits recited herein can be combined. For example, if a particular parameter is disclosed to have suitable minima of 1, 2, and 3, and if that parameter is disclosed to have suitable maxima of 9 and 10, then all the following ranges are contemplated: 1 to 9, 1 to 10, 2 to 9, 2 to 10, 3 to 9, and 3 to 10.

It is to be understood that for purposes of the present specification and claims that each operation disclosed herein is performed at 25° C. unless otherwise specified.

EXAMPLES

Coating Compositions

Each Polymer was made by solution polymerization in a polymerization solvent. The polymer solution thus made was then added to a coating solvent to make each of the coating compositions shown below.

Surface Disinfection Test Procedure:

In the Examples below, coating compositions were tested according to "Protocol #01-1A: Protocol for Residual Self-Sanitizing Activity of Dried Chemical Residues on Hard, Non-Porous Surfaces," (herein called "EPA Protocol") published by the U.S. Environmental Protection Agency, 1200 Pennsylvania Avenue, N.W., Washington, D.C. 20460, USA, available at http://www.epa.gov/oppad001/cloroxpcol_final.pdf.

The EPA protocol involves decontaminating the surface of a plate; innoculating the surface with a microorganism; applying the coating composition of interest to surface; allowing the coating composition to dry; exposing the coated surface to one scrub cycle with a Gardner abrasion tester; repeating the inoculation and scrub steps; incubating the plates; and counting the number of surviving microorganisms. Multiple plates are tested for the control treatment and for each of the tested coating compositions. The results are reported as "% reduction," which is the difference of the geometric mean of the number of surviving organisms in the control samples and the geometric mean of the number of surviving organisms in the test samples, multiplied by 100 and divided by the geometric mean of the number of surviving organisms in the control samples.

The tests reported below used the EPA protocol with 8 or 12 scrub cycles. The microorganism used was either *Staphylococcus aureus* or *Klebsiella pneumoniae*.

Turbidity Test Procedure:

In some of the Examples below, sample solutions were tested for turbidity as follows. Sample solution was placed in a vial of size 30 ml (1 ounce) and measured using HF Scientific Micro 100 Laboratory Turbidimeter, using specifications published by the United States Environmental Protection Agency as EPA method 180.1 (Nephelometric Method). Results are reported as Nephelometric Turbidity Units (NTU). Higher numbers of NTU means higher turbidity (i.e., less clarity).

In the Examples below, the following abbreviations are used:

VI=vinyl imidazole

PMA=polyethylene glycol methacrylate having poly(ethylene oxide) chain of approximately 10 units. The number-average molecular weight of the PMA monomer is approximately 475.

nVP=n-vinyl pyrrolidone

Psol=polymerization solvent

Csol=coating solvent

OPP=o-phenyl phenol

Q1=Hyamine 3500: alkyl dimethyl benzyl ammonium chloride (from Lonza, Inc.) (alkyl is 40% C12, 50% C14, 10% C16)

Q2=BTC 2125M: 25% active n-alkyl (60% C14, 30% C16, 5% C12, 5% C18) dimethyl benzyl ammonium chloride and 25% active n-alkyl (68% C12, 32% C14) dimethyl ethylbenzyl ammonium chloride (from Stepan Company)

Mon1=first monomer, as defined herein above

Mon2=second monomer, as defined herein above

P'mer=polymer

MB=microbicide

RH=relative humidity

Reduc. %=% Reduction (results of EPA Protocol)

ME6=Methocel™ E6 hydroxypropyl cellulose (Dow Chemical Co.)

VEOVA=vinyl neodecanoate

Examples 3 and 5, and Comparative Examples 1, 2, and 4

Organism was *S. aureus*.

| Ex. No. | Psol | Mon1 type | Mon1 %[1] | Mon2 type | Mon2 %[1] | P'mer %[2] | MB type | MB %[3] | Csol | Reduc. % |
|---|---|---|---|---|---|---|---|---|---|---|
| C1 | W | VI | 50 | PMA | 50 | 1 | — | 0 | W | 9[12] |
| C2 | — | — | — | — | — | 0 | Q1 | 0.33 | W | 72[13] |
| 3 | E | VI | 50 | PMA | 50 | 1 | Q1 | 0.30 | W | 100[13] |

-continued

| Ex. No. | Psol | Mon1 type | Mon1 %[1] | Mon2 type | Mon2 %[1] | P'mer %[2] | MB type | MB %[3] | Csol | Reduc. % |
|---|---|---|---|---|---|---|---|---|---|---|
| C4 | — | — | — | — | — | 0 | OPP | 5.0 | E | 80[16] |
| 5 | W | VI | 50 | PMA | 50 | 1 | OPP | 5.0 | E | 100[17] |

[1]% by weight, based on the weight of polymer
[2]% by weight of polymer, based on the weight of the total composition
[3]% by weight of active ingredient, based on the weight of the total composition
[12]tested at 25% RH, 21° C., 8 scrub cycles
[13]tested at 31% RH, 21° C., 8 scrub cycles
[16]tested at 32% RH, 21° C., 8 scrub cycles
[17]tested at 32% RH, 21° C., 12 scrub cycles The Examples give better % Reduction than the compositions containing microbiocide alone or polymer alone.

Examples 6-9

Coating solvent was water. Testing was 31% RH, 21° C., 8 scrub cycles. Organism was *S aureus*.

| Ex. No. | Psol | Mon1 type | Mon1 %[1] | Mon2 type | Mon2 %[1] | P'mer %[2] | MB type | MB %[3] | Reduc. % |
|---|---|---|---|---|---|---|---|---|---|
| 6 | W | VI | 50 | PMA | 50 | 1 | Q1 | 0.30 | 100 |
| 7 | W[18] | VI | 100 | — | 0 | 1 | Q1 | 0.30 | 100 |
| 8 | E | VI | 10 | PMA | 90 | 1 | Q1 | 0.30 | 89 |
| 9 | E | VI | 30 | PMA | 70 | 1 | Q1 | 0.30 | 100 |

[1]-[3]as above
[18]polymer was prepared by precipitation polymerization; solid polymer was then dissolved in water All the Examples give acceptable % Reduction.

Examples 10-11

Organism was *S aureus*. 8 scrub cycles were used.

| Ex. No. | Psol | Mon1 type | Mon1 %[1] | Mon2 type | Mon2 %[1] | P'mer %[2] | MB type | MB %[3] | Reduc. % |
|---|---|---|---|---|---|---|---|---|---|
| 10 | W | VI | 50 | nVP | 50 | 1 | Q1 | 0.30 | 100[22] |
| 11 | W | VI | 50 | PMA | 50 | 1 | Q1 | 0.30 | 100[23] |

[1]-[3]as above
[22]44% RH, 22° C.
[23]32% RH, 21° C.

Both Examples show good microbiocidal activity.

Examples 12-16

Organism was *S aureus*. Tested at 50% RH, 21° C., 8 scrub cycles.

| Ex. No. | solvent | Mon1 type | Mon1 %[1] | Mon2 type | Mon2 %[1] | P'mer %[2] | MB type | MB %[3] | Reduc. % |
|---|---|---|---|---|---|---|---|---|---|
| 12 | W | VI | 50 | PMA | 50 | 1 | Q1 | 0.30 | 100 |
| 13 | W | VI | 50 | PMA | 50 | 1 | Q1 | 0.15 | 100 |
| 14 | W | VI | 50 | PMA | 50 | 1 | Q1 | 0.075 | 100 |
| 15 | W | VI | 50 | PMA | 50 | 1 | Q1 | 0.035 | 98 |
| 16 | W | VI | 50 | PMA | 50 | 0.5 | Q1 | 0.30 | 100 |

[1]-[3]as above

Examples with varying amounts of polymer and/or microbicide are all effective at inhibiting microorganisms.

Examples 17-22

Organism was *S aureus*. Tested at 58% RH, 23° C., 8 scrub cycles.

| Ex. No. | solvent | Mon1 type | Mon1 %[1] | Mon2 type | Mon2 %[1] | P'mer %[2] | MB type | MB %[3] | Reduc. % |
|---|---|---|---|---|---|---|---|---|---|
| 17 | W | VI | 50 | PMA | 50 | 1 | Q2 | 0.30 | 100 |
| 18 | W | VI | 50 | PMA | 50 | 0.5 | Q2 | 0.30 | 100 |
| 19 | W | VI | 50 | nVP | 50 | 1 | Q2 | 0.30 | 100 |
| 20 | W | VI | 50 | nVP | 50 | 0.5 | Q2 | 0.30 | 100 |
| 21 | W | VI | 75 | nVP | 25 | 1 | Q2 | 0.30 | 100 |
| 22 | W | VI | 25 | nVP | 75 | 1 | Q2 | 0.30 | 100 |

[1]-[3]as above

Example compositions with various polymers were all effective at inhibiting microorganisms.

Examples 23-29

5-Minute Disinfectant Results

Test Procedure was AAOC Official Method 961.02, "Germicidal Spray Products as Disinfectants" (American Association of Official Analytical Chemists, Manassas, Va., USA). Slide was innoculated with test organism; product was applied; after contact time of 5 minutes, sample was neutralized, then incubated for 48 hours. Then slides were evaluated to determine whether growth of microorganism was present; "pass" means there was no growth.

Test organism A ("O-A") was *S. Aureus* ATCC 6538 (microorganism identification number by ATCC, Manassas, Va., USA). Test organism B ("O-B") was *E. Coli* ATCC 8739. Test organism C ("O-C") was *P. Aeruginosa* ATCC 15442.

Polymerization solvent and coating solvent were each water. The tested formulations and the results were as follows. Examples marked with "C" are comparative.

| Ex. No. | Mon1 type | Mon1 %[1] | Mon2 type | Mon2 %[1] | P'mer %[2] | MB type | MB %[3] | vs. O-A | vs. O-B | vs. O-C |
|---|---|---|---|---|---|---|---|---|---|---|
| C23 | — | — | — | — | 0 | Q1 | 0.35 | pass | pass | pass |
| C24 | VI | 50 | PMA | 50 | 1 | — | 0 | fail | fail | fail |
| 25 | VI | 50 | PMA | 50 | 1 | Q1 | 0.35 | pass | pass | pass |
| 26 | VI | 50 | PMA | 50 | 1 | Q1 | 0.15 | pass | pass | pass |
| 27 | VI | 50 | nVP | 50 | 1 | — | 0 | fail | fail | fail |
| 28 | — | — | — | — | 0 | Q2 | 0.30 | pass | pass | pass |
| 29 | VI | 50 | nVP | 50 | 1 | Q2 | 0.30 | pass | pass | pass |

[1]-[3] as above

Example 30

Use of Epoxide

"P5" is the polymer used in Example 5 above. "E1" is SR-GLG, a glycerine type epoxy resin from Sakamoto Yakuhin Kogyo Co., Ltd, Osaka, Japan. An aqueous solution was prepared containing 1% P5 and 0.6% E1 by solids weight based on the total weight of the solution. The solution was heated to 40° C. for 20 minutes and then to 60° C. for 2.5 hours. Then the pH was adjusted to 8.01 with citric acid. Then microbicide Q1 was added to give 0.30% by weight of microbicide based on the total weight of the solution.

The resulting solution was tested as in Examples 17-22, using 61% RH at 21° C. After 8 scrub cycles, % Reduction was 100%.

Examples 31-43

Polymer "P31" was a solution polymer prepared in solvent that was 100% ethanol by weight based on the weight of the solvent, with monomer mixture (by weight percent, based on the total weight of monomers) 25 VI/65 nVP/10 VEOVA. The resulting polymer solution had 40.75% solid polymer by weight based on the weight of the solution.

Polymer "P32" was a solution polymer prepared in solvent that was 50% ethanol and 50% water by weight, based on the weight of the solvent, with monomer mixture (by weight percent, based on the total weight of monomers) 25 VI/65 nVP/10 VEOVA. The resulting polymer solution had 42.68% solid polymer by weight based on the weight of the solution.

Polymer "P41" was a solution polymer prepared in solvent that was 100% ethanol, with monomer mixture (by weight percent, based on the total weight of monomers) 25 VI/70 nVP/5 VEOVA. The resulting polymer solution had 40.49% solid polymer by weight based on the weight of the solution.

Polymer "P42" was a solution polymer prepared in solvent that was 100% ethanol, with monomer mixture (by weight percent, based on the total weight of monomers) 25 VI/60 nVP/15 VEOVA. The resulting polymer solution had 36.87% solid polymer by weight based on the weight of the solution.

In each of the following formulations, one of the above polymer solutions was added to water to give a test solution having 1% solid polymer by weight, based on total weight of the test solution. Microbicide Q2 was also added in the amounts shown, given as weight of active ingredient, based on total weight of the test solution. Quick Kill was tested as described above, vs. O-A. Reduc % was tested after 12 scrub cycles, as defined above. Turbidity ("Trb") was measured as described above. Appearance ("Appr") was assessed by eye. "NT" in the table below means "not tested."

| Ex. No. | P'mer type | MB type | MB % | Trb (NTU) | Appr | Quick Kill | Reduc % |
|---|---|---|---|---|---|---|---|
| 31 | P31 | Q2 | 0.30 | 2.3 | clear | pass | 100 |
| 32 | P32 | Q2 | 0.30 | 46 | hazy | pass | 100 |
| 33 | P31 | Q1 | 0.35 | 3.4 | clear | NT | NT |
| 34 | P31 | Q2 | 0.30 | 7.2 | clear | pass | NT |
| 35 | P31 | Q2 | 0.30 | 9.0 | clear | pass | NT |
| 36 | P31 | Q2 | 0.30 | 1.3 | clear | pass | NT |
| 37 | P31 | Q2 | 0.17 | 3.8 | clear | pass | NT |
| 38 | P31 | Q2 | 0.075 | 4.6 | clear | fail | NT |
| 39 | P31 | Q2 | 0.035 | 19 | vsl[24] | fail | NT |
| C40 | P31 | — | 0 | 40 | sl[24] | fail | NT |
| 41 | P41 | Q2 | 0.30 | 1.6 | clear | pass | 100 |
| 42 | P42 | Q2 | 0.30 | 21 | vsl[24] | pass | 100 |
| 43[26] | P31 | Q2 | 0.30 | 5.3 | clear | NT | NT | note
[24] very slight haze note
(25): *slight haze* note
[26] Example 43 additionally contained 0.5% ME6 by weight based on the total weight of the solution.

We claim:

1. A coating composition comprising
   (a) one or more microbicide,
   (b) one or more soluble polymer comprising, as polymerized units, one or more monomer with one or more pendant heterocycle, wherein said heterocycle has one or more hetero atom selected from the group consisting of N, O, S, and combinations thereof, wherein said polymer has no anionic groups, with the proviso that, if every one of said pendant heterocycles is saturated, then said soluble polymer additionally comprises one or more polymerized units of one or more heterocycle-free vinyl monomer, and
   (c) solvent,
   wherein said polymer is dissolved in said solvent; wherein said composition contains no polymeric biguanide; and wherein 50% or more of said microbicide, by weight based on the total weight of microbicide, is not covalently bonded to any polymer,
   wherein said microbicide comprises one or more quaternary ammonium microbicide, one or more phenol microbicide, or a mixture of one or more quaternary ammonium microbicide with one or more phenol microbicide.

2. The coating composition of claim 1, wherein said monomer with one or more pendant heterocycle comprises vinyl imidazole.

3. A coating composition according to claim 1 comprising
   (a) one or more microbicide,
   (b) one or more soluble polymer comprising, as polymerized units, one or more monomer with one or more pendant heterocycle, wherein said heterocycle has one or more hetero atom selected from the group consisting of N, O, S, and combinations thereof, wherein said polymer has no anionic groups, with the proviso that, if every one of said pendant heterocycles is saturated, then said soluble polymer additionally comprises one or more polymerized units of one or more heterocycle-free vinyl monomer, and (c) solvent, wherein said polymer is dissolved in said solvent; wherein said composition contains no polymeric biguanide; and wherein 50% or more of said microbicide, by weight based on the total weight of microbicide, is not covalently bonded to any polymer, and wherein said soluble polymer additionally comprises one or more polymerized unit of a monomer that contains one or more pendant alkylene oxide groups.

4. The coating composition of claim 1, comprising;

(a) one or more microbicide, (b) one or more soluble polymer comprising, as polymerized units, one or more monomer with one or more pendant heterocycle, wherein said heterocycle has one or more hetero atom selected from the group consisting of N, O, S, and combinations thereof, wherein said polymer has no anionic groups, with the proviso that, if every one of said pendant heterocycles is saturated, then said soluble polymer additionally comprises one or more polymerized units of one or more heterocycle-free vinyl monomer, and (c) solvent, wherein said polymer is dissolved in said solvent; wherein said composition contains no polymeric biguanide; and wherein 50% or more of said microbicide, by weight based on the total weight of microbicide, is not covalently bonded to any polymer, and wherein said soluble polymer additionally comprises one or more polymerized unit of a heterocycle-free vinyl monomer.

5. The coating composition of claim 1, wherein said composition, when dry, is not tacky.

6. A coating composition according to claim 1 comprising (a) one or more microbicide, (b) one or more soluble polymer comprising, as polymerized units, one or more monomer with one or more pendant heterocycle, wherein said heterocycle has one or more hetero atom selected from the group consisting of N, O, S, and combinations thereof, wherein said polymer has no anionic groups, with the proviso that, if every one of said pendant heterocycles is saturated, then said soluble polymer additionally comprises one or more polymerized units of one or more heterocycle-free vinyl monomer, and (c) solvent, wherein said polymer is dissolved in said solvent; wherein said composition contains no polymeric biguanide; and wherein 50% or more of said microbicide, by weight based on the total weight of microbicide, is not covalently bonded to any polymer, and wherein said composition additionally comprises an epoxy resin.

7. A method of coating a substrate comprising applying a layer of the composition of claim 1 and drying said layer or allowing said layer to dry, wherein said substrate is selected from the group consisting of walls, floors, ceilings, partitions, instruments, sinks, toilets, plastic substrates, formica substrates, metal substrates, glass substrates, paper substrates, fabric substrates, finished wood substrates, and unfinished wood substrates.

8. A coated substrate made by the method of claim 7.

9. A method of coating a substrate comprising applying a layer of the composition of claim 3 and drying said layer or allowing said layer to dry, wherein said substrate is selected from the group consisting of walls, floors, ceilings, partitions, instruments, sinks, toilets, plastic substrates, formica substrates, metal substrates, glass substrates, paper substrates, fabric substrates, finished wood substrates, and unfinished wood substrates.

10. A coated substrate made by the method of claim 9.

11. A method of coating a substrate comprising applying a layer of the composition of claim 4 and drying said layer or allowing said layer to dry, wherein said substrate is selected from the group consisting of walls, floors, ceilings, partitions, instruments, sinks, toilets, plastic substrates, formica substrates, metal substrates, glass substrates, paper substrates, fabric substrates, finished wood substrates, and unfinished wood substrates.

12. A coated substrate made by the method of claim 11.

13. A method of coating a substrate comprising applying a layer of the composition of claim 6 and drying said layer or allowing said layer to dry, wherein said substrate is selected from the group consisting of walls, floors, ceilings, partitions, instruments, sinks, toilets, plastic substrates, formica substrates, metal substrates, glass substrates, paper substrates, fabric substrates, finished wood substrates, and unfinished wood substrates.

14. A coated substrate made by the method of claim 13.

* * * * *